United States Patent
Daddi et al.

(10) Patent No.: US 8,834,175 B1
(45) Date of Patent: Sep. 16, 2014

(54) DOWNLOADABLE TRAINING CONTENT FOR CONTACT CENTER AGENTS

(71) Applicant: Noble Systems Corporation, Atlanta, GA (US)

(72) Inventors: Rajesh S. Daddi, Atlanta, GA (US); Patrick McGuire McDaniel, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/744,895

(22) Filed: Jan. 18, 2013

Related U.S. Application Data

(63) Continuation-in-part of application No. 13/624,023, filed on Sep. 21, 2012, now Pat. No. 8,535,059, and a continuation-in-part of application No. 13/683,145, filed on Nov. 21, 2012.

(51) Int. Cl.
   *G09B 7/00* (2006.01)
   *G09B 5/00* (2006.01)

(52) U.S. Cl.
   CPC .................................. *G09B 5/00* (2013.01)
   USPC ........................... 434/323; 434/322; 434/350

(58) Field of Classification Search
   CPC .......................................................... G09B 5/00
   USPC ................................ 434/219, 322, 323, 365
   See application file for complete search history.

(56) References Cited

U.S. PATENT DOCUMENTS

| | | | |
|---|---|---|---|
| 6,301,573 B1 | 10/2001 | McIlwaine et al. | |
| 6,324,282 B1 | 11/2001 | McIllwaine et al. | |
| 6,459,787 B2 | 10/2002 | McIllwaine et al. | |
| 6,628,777 B1 | 9/2003 | McIllwaine et al. | |
| 6,775,377 B2 | 8/2004 | McIllwaine et al. | |
| 7,043,193 B1 | 5/2006 | Vashi et al. | |
| 7,158,628 B2 | 1/2007 | McConnell et al. | |
| 7,174,010 B2 | 2/2007 | McIlwaine et al. | |
| 7,660,407 B2 | 2/2010 | Fama | |
| 8,108,237 B2 | 1/2012 | Bourne et al. | |
| 8,112,306 B2 | 2/2012 | Lyerly et al. | |
| 8,117,064 B2 | 2/2012 | Bourne et al. | |
| 2003/0044761 A1* | 3/2003 | Houlihan et al. | 434/350 |

(Continued)

OTHER PUBLICATIONS

Noble Systems Corporation, ShiftTrack Plus User Manual 5.6, Mar. 2012, 1350 pages, Atlanta, GA.

(Continued)

*Primary Examiner* — Bruk Gebremichael

(57) ABSTRACT

A training portal facilitates an agent's management of training courses, including reviewing a training goal, indicating training courses available for the agent to download, downloading a specified training course to the agent, and receiving uploaded test results associated with a previously downloaded training course. The training portal may cooperate with an e-learning system for identifying downloadable courses, and may cooperate with a content delivery system for receiving the specified course which is to be downloaded to the agent. At a subsequent time, after the agent has interacted with a testing portion of the downloadable course, the agent may upload the test results to the portal. The training portal may be configured to receive test results uploaded within a certain time period. Once the training portal receives the test results, it provides the test results to the content delivery source. The content delivery source may then update the e-learning system.

15 Claims, 12 Drawing Sheets

(56) References Cited

U.S. PATENT DOCUMENTS

| | | |
|---|---|---|
| 2003/0129574 A1* | 7/2003 | Ferriol et al. .................. 434/362 |
| 2004/0165717 A1 | 8/2004 | McIlwaine et al. |
| 2004/0202308 A1 | 10/2004 | Baggenstoss |
| 2004/0202309 A1 | 10/2004 | Baggenstoss et al. |
| 2005/0175971 A1 | 8/2005 | McIlwaine et al. |
| 2006/0072739 A1 | 4/2006 | Baggenstoss et al. |
| 2006/0105315 A1* | 5/2006 | Shaver .......................... 434/362 |
| 2006/0188860 A1* | 8/2006 | Morrison ...................... 434/322 |
| 2006/0256953 A1 | 11/2006 | Pulaski et al. |
| 2007/0127689 A1 | 6/2007 | McIlwaine et al. |
| 2007/0195944 A1 | 8/2007 | Korenblit et al. |
| 2007/0195945 A1 | 8/2007 | Korenblit |
| 2007/0198322 A1 | 8/2007 | Bourne et al. |
| 2007/0198325 A1 | 8/2007 | Lyerly |
| 2007/0220145 A1* | 9/2007 | Kozakura et al. ............. 709/225 |
| 2008/0057482 A1* | 3/2008 | Snyder et al. ................. 434/350 |
| 2008/0241812 A1* | 10/2008 | Ashmore et al. .............. 434/365 |
| 2009/0181356 A1* | 7/2009 | Dasgupta ...................... 434/362 |
| 2010/0035220 A1* | 2/2010 | Herz et al. .................... 434/236 |
| 2011/0125499 A1 | 5/2011 | Griggs et al. |
| 2012/0088217 A1* | 4/2012 | Freeman ....................... 434/350 |
| 2012/0231441 A1* | 9/2012 | Parthasarathy et al. ....... 434/362 |

OTHER PUBLICATIONS

Noble Systems Corporation, NobleWFM 2010.1.0 User Guide, Mar. 28, 2011, 324 pages, Atlanta, GA.

* cited by examiner

DOWNLOADABLE TRAINING CONTENT FOR CONTACT CENTER AGENTS

CROSS REFERENCE TO RELATED APPLICATIONS

This application os a continuation of U.S. patent application Ser. No. 13/744,895, entitled Downloadable Training Content for Content Center Agents and filed Jan. 18, 2013, which is a continuation-in-part of U.S. patent application Ser. No. 13/624,023, entitled Learning Management System for Call Center Agents, filed on Sep. 21, 2012, and a continuation-in-part of U.S. patent application Ser. No. 13/683,145 entitled Training Portal for Call Center Agent Training, filed on Nov. 21, 2012, for which the contents of all are incorporated by reference for all that they teach.

BACKGROUND

Contact centers often employ a number of agents for handling inbound and outbound calls. The nature and purpose of the calls may vary greatly over a short time. For example, outbound calling campaigns may involve originating calls to collect debts, solicit donations for a non-profit organization, or offer new products for sale. Agents assigned to these campaigns must be trained with the appropriate debt collection practices, familiar with the non-profit organization for which donations are sought, or knowledgeable about the products being offered for sale. These same agents may also be involved in handling inbound calls, and may be trained to answer questions associated with various products, customers seeking service, etc.

It is evident that these agents must be trained in a variety of areas including how to operate the call center computer workstations, interact with other customer information systems for updating customer records, research product features, or being familiar with guidelines and policies associated with a telemarketing campaign. Additionally, it is not uncommon for employee turnover in call centers to be relatively high, requiring continual training of new agents. Agent training is important since training increases their effectiveness. Failure to train an agent can result in poor customer service, loss of revenue, and other adverse impacts. Thus, an efficient and effective infrastructure for training contact center agents is necessary.

Training systems may provide computer-based learning that allows each agent to receive training in a manner that suits the agent's schedule. Some training systems are designed to be locally executed on the agent's workstation computer while other training systems can be hosted on a server and can provide training content streamed to the agent via network interconnection.

The growing popularity of tablet computers, which is one form of a growing category of mobile processing devices, allows agents to obtain training whenever it is convenient to their schedule. This may require that the training content be downloaded into their mobile device well in advance of when the training session actually begins. In other applications, an agent may desire to interact with training content using their home computer during their off-hours. In either instance, the agent may interact with the training content after it is loaded into their computer.

However, such training systems are not integrated into the contact center infrastructure and may cause additional administrative burdens to coordinate training between the agent, call handling systems, and the training infrastructure. Further, such training systems are not configured to accommodate mobile devices to their maximum potential or download training content to other processing devices. Thus, contact centers have a need for an integrated, efficient, and flexible architecture for managing training content that involves inter alia, mobile devices. It is with regard to this and other aspects that the present disclosure is presented.

BRIEF SUMMARY

Technologies are generally presented herein pertaining to a learning management system providing downloadable training courses. In certain embodiments, a training course may comprise a training content portion and a testing portion. In addition, in certain embodiments, the downloadable training courses are downloaded to mobile devices used by call center agents. The call center agents can subsequently interact with the training content portion to learn the course content and interact with the testing portion to demonstrate their knowledge of the course content. In particular instances, the agents can subsequently upload the test results after interacting with the testing portion.

In particular embodiments, a training portal provides a point-of-contact for an agent to access to receive and manage their training, including such actions as reviewing training courses the agent has taken, reviewing training courses available to the agent to take, and/or downloading a training course. The agent can also use the training portal to upload test results. In particular instances, the portal may provide the test results to a component in an e-learning system so that the test results may be processed and appropriate updates may be recorded in the agent's training profile.

In one embodiment, the training portal is a web server configured to provide various web pages to the user, and to provide indications of training courses that can be downloaded to a mobile processing device, or other form of processing device, used by the agent. After downloading a training course and logging-off from the portal, the agent can then subsequently interact with the training course, including the testing portion. The mobile device retains the testing results, and after the agent subsequently logs-in to the portal, the testing results are uploaded to the portal.

In one embodiment, the training course is configured to prevent subsequent unauthorized interaction with the training course including preventing the user from subsequently downloading the training course from the mobile device to another unauthorized device or for storage in another storage medium. In certain embodiments, the user may have a time limit during which they must interact with the training course.

Depending on the embodiment, the architecture may use various data structures that allow appropriate information to be maintained about the training status for the agent and how courses are to be provided to agent. Thus, in particular embodiments, the architecture allows training to be provided to agents in a flexible and adaptable manner, and allows various levels of integration with operation of call center components.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
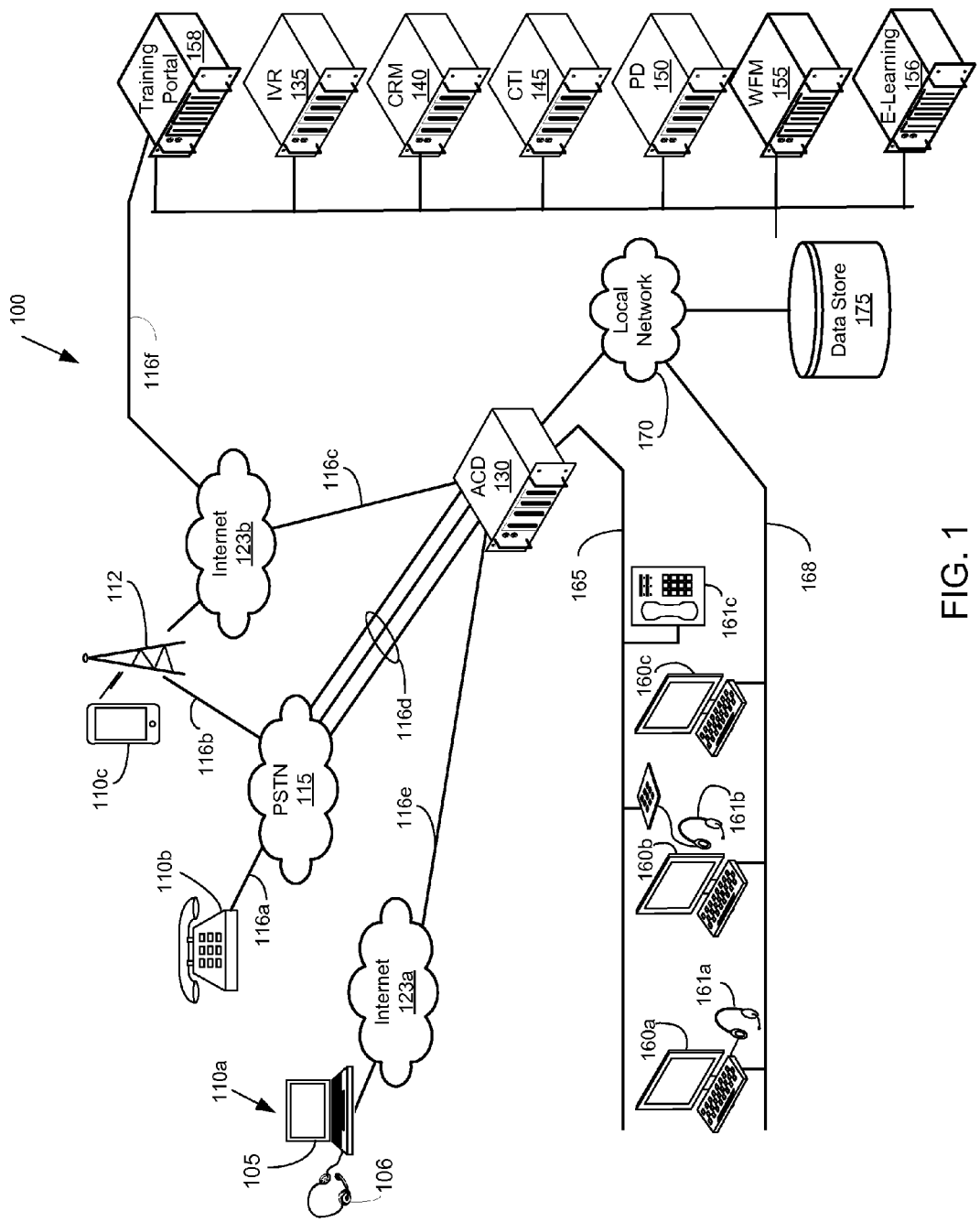
FIG. 1 shows one embodiment of a contact center architecture for which the various technologies disclosed herein can be applied.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Although many aspects of contact center operation are disclosed in the context of voice calls, the contact center may process other forms of communication such as facsimiles, emails, text messages, video calls, chat messages, and other forms. Since the contact center may handle calls originating from a calling party, or initiated to a called party, the term "party" without any further qualification refers to a person associated with an instance of communication processed by the contact center, such as a call, where the call is either received from or placed to the party. The term "caller," if used, may generally refer to a party calling the contact center, but in many cases this usage is exemplary. Thus, use of the term "caller" is not intended to necessarily limit the concepts herein to only inbound calls unless the context dictates such.

Inbound voice calls may originate from calling parties using a variety of phone types. A calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: Ti trunks, SONET based fiber optic networks, ATM networks, etc. Various types of routers, switches, bridges, gateways, and other types of equipment may be involved in the processing of a call.

Inbound voice calls may also originate from a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123a using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" as referred to herein is not limited to time-division multiplexing ("TDM") technology.

Voice calls may also originate from a calling party employing a so-called "IP phone," "VoIP phone," or "soft phone" 110a. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile device 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may also be referred to as a "call leg" existing between the caller and certain equipment. A call may comprise a number of concatenated call legs, as known to those skilled in the art. In certain contexts, which will be made explicit, the call may encompass communications other than voice, e.g., text messages, video chat, facsimile, etc.

Inbound calls from callers to the contact center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over contact center facilities 165 to an available agent. The facilities 165 may be any suitable technology for conveying the call, including, but not limited to, a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

An agent typically logs onto their workstation prior to handling calls. This allows the contact center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A contact center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a contact center to control and/or coordinate other components of the contact center architecture 100. Specifically, the CTI server 145 may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer along with routing the call to the agent's workstation phone. For example, the ANI can also be used to ascertain a party's status (e.g., a "Gold Level" customer warranting premium service) to facilitate the ACD 130 routing the call to a select group of agents. The data store 175 can be a database storing records of caller information. The data store 175 can be integrated with the CTI server 145, the ACD 130, or segregated as a standalone database. Thus, the call and associated call data retrieved from the data store 175 are presented at the agent's headset 161b and their computer 160b. In other embodiments, data may be stored in the data store 175 by the agent, ACD, or other entity.

The ACD 130 may place a call in a queue if there are no suitable agents available, or it may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other components, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160a-160c, as well as other components, may involve using a local area network ("LAN") 170. Other communication configurations are possible, such as, but not limited to, using a wide area network, wireless network, router, bridge, direct point-to-point links, etc.

When an agent is interacting with a called or calling party, the agent may use their workstation computer 160b to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, and facsimiles, and the contact center may also originate communications to a called party, referred to herein as "outbound" communications. In some embodiments, a contact center may employ a dialer 150, such as a predictive dialer, to originate outbound calls on behalf of an agent at a rate designed to meet various criteria. Similar to the other components within the contact center architecture 100, the dialer 150 may comprise one or more software modules executing on processing device hardware platform.

The dialer 150 is typically configured to dial a list of telephone numbers to initiate outbound calls, which can be accomplished in one embodiment by instructing the ACD 130 to originate calls. In some embodiments, the ACD 130 may include functionality for originating calls, and if so, this component may be referred to as a private automatic branch exchange ("PBX" or "PABX"). In other embodiments (not shown), the dialer 150 may directly interface with voice trunks using facilities 116c, 116d to the PSTN 115 for originating calls. After the calls are originated, a transfer operation by the ACD 130 or the dialer 150 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another component that may be employed in a contact center is a workforce management ("WFM") 155. This component maintains information to generate agent's schedules to effectively handle inbound/outbound calls. The WFM 155 may maintain historical call volume information for call campaigns and forecast expected call volume to predict the number of agents needed to handle the call volume at a defined service level. The WFM 155 can then apply information about available agents to then generate a work roster of agents. In other words, the WFM 155 schedules agents for their work shifts according to the anticipated needs of the call campaigns.

In various embodiments, the contact center architecture 100 may include an e-learning system 156 to perform various training-related functions. The e-learning system 156 may coordinate other components to provide training to agents. In some embodiments, the e-learning system 156 could be a distinct system that cooperates with the WFM 155, or the e-learning system could comprise a module incorporated in the WFM 155. Various embodiments are possible and FIG. 1 only illustrates one embodiment. Further details on the e-learning architecture will be discussed below.

In various embodiments, the contact center architecture 100 may include a training portal 158. The training portal 158 may be, in one embodiment, a web server that allows users (such as agents or call center administrators) to manage training. The training portal 158 may also have connection to Internet related facilities either directly, or via other call center components. The training portal 158 may interact with the e-learning system, and may also function as a "front-end" to allow these users to easily interact with the e-learning system for managing training. The training portal 158 may also coordinate with other providers of downloadable content, and may also receive uploads from a user comprising test results associated with previously downloaded content. The training portal 158 may also coordinate providing uploaded content back to the content provider and/or the e-learning system as required. In various embodiments, the e-learning system and/or training portal 158 may be offered in a hosted environment or as a service offered by a third party provider.

An agent may be considered as being in one of four different modes when working. Thus, these modes can be said to describe the agent during a shift. During a shift, the agent is "logged-in" to the ACD and/or the WFM and is typically available and ready for receiving calls or other forms of communication, if any are present. This can be described as the "ready" mode. If the agent is connected and speaking with a caller, then the agent can be described as being in the "connected" mode. Once the call terminates, the agent may have additional work to perform such as, for instance, recording notes on the caller's record. This can be described as "after-call-work" mode. Once the agent has indicated a disposition, the agent returns to the ready mode. In addition, the agent can be removed from the ready mode and placed into a "pause" mode. In this mode, the ACD typically suspends offering calls to the agent. The agent may be placed into the pause mode by another entity (e.g., the supervisor) or the agent may request to be placed into the pause mode. If the agent requests to be placed into the pause mode, they are usually prompted to enter a "pause code." The pause code indicates the nature of the break, such as a lunch break, bathroom break, etc. Typically, if the agent is in the connected mode and requests to be placed into the pause mode, the call is allowed to complete. That is, an agent requesting to be placed into the pause mode does not typically interrupt a current call. The ready mode, connect mode, after-call-work mode, and the pause mode all occur when the agent is logged-in to the ACD. When the agent logs off or logs out, then none of the above modes can exist. Thus, the above modes presume that the agent is logged-in. An agent that is not logged-in and is presently working their shift would be considered "off-the-clock."

Although the above components may be variously referred to as "servers," each may be also referred to as a "processing device," "unit," "component" or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, the IVR server 135, the CRM server 140, the CTI server 145, and/or the dialer 150 may be combined into single hardware platform executing one of more software modules. The training portal 158 may be integrated with the e-learning system 156, and either or both may be integrated or otherwise combined with the WFM 155.

In addition, the contact center architecture 100 may be provided as a hosted solution, where the call processing functionality is provided as a communication service (a so-called "communication as a service" or "CaaS") to a contact center operator. Thus, there is no requirement that the components identified above must be actually located or controlled by a contact center operator. Specifically, the learning management system and/or the training portal disclosed herein can be provided on a hosted basis in a variety of configurations.

In addition, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and telephones as workstations. In some configurations, a single physical location of the contact center may not be readily identifiable. This may occur when the call processing functions are provided as a service in a hosted cloud computing environment and the agents positions are in their individual residences.

Those skilled in art will recognize FIG. 1 represents one possible configuration of a contact center architecture 100, and that variations are possible with respect to the protocols, configuration, facilities, technologies, and equipment used. The specific components that are present in a contact center may vary, and for this reason a generic term of a "call handling system" will be used. Reference to this term should be understood to also encompass components that handle forms of contacts other than just telephone calls, such as emails, text, web chats, etc.

Overview of the E-Learning System

A brief overview of the e-learning system is appropriate to understand the interaction of the training portal with respect to the e-learning system. A complete description of the e-learning system is contained in the U.S. patent application Ser. No. 13/624,023, entitled Learning Management System for Call Center Agents, filed on Sep. 21, 2012, (henceforth referred to as the "the LMS Patent Application"), the contents of which are incorporated by reference.

Figure 2:
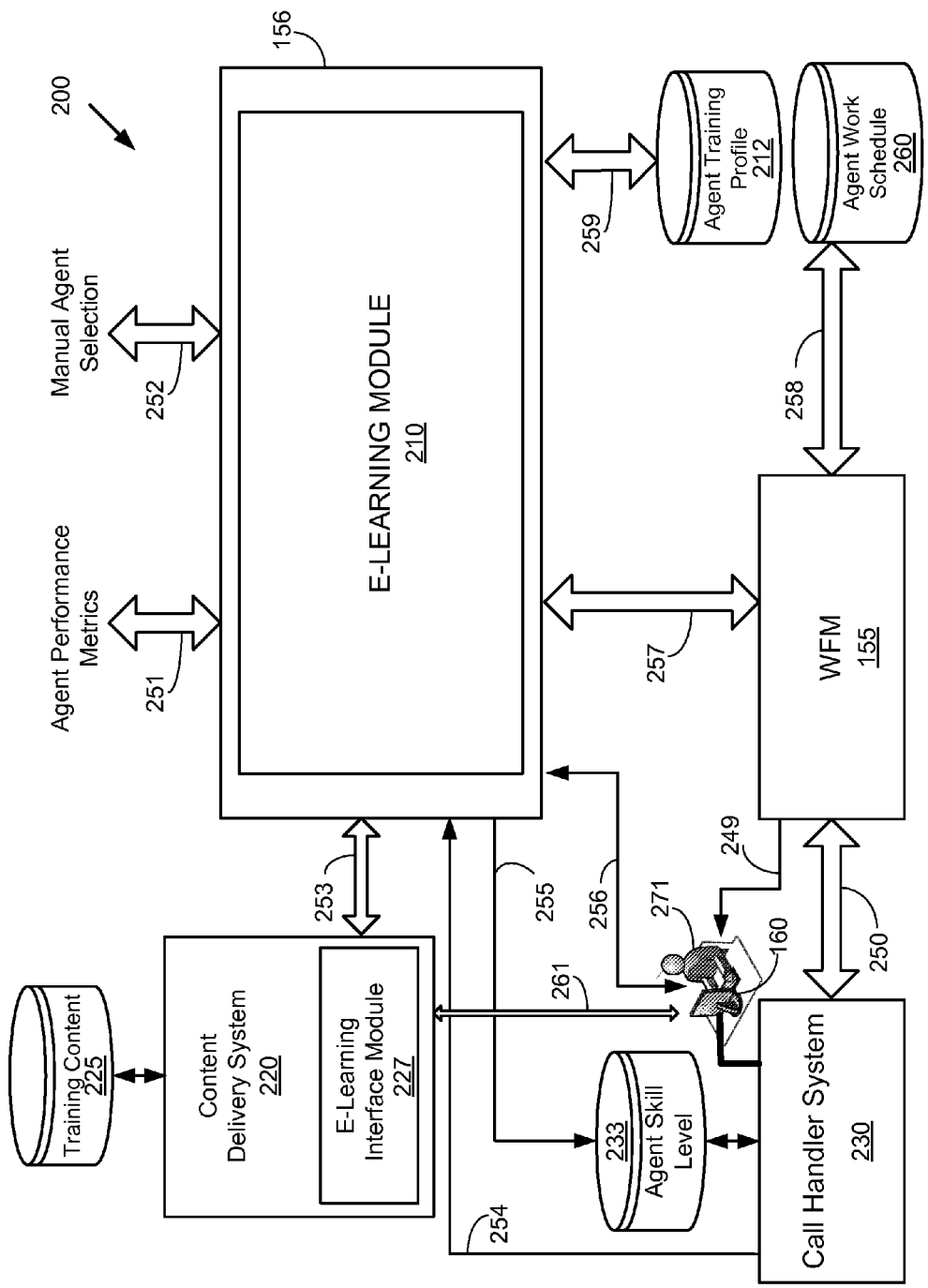
FIG. 2 illustrates one embodiment of an e-learning management system comprising an e-learning module.

FIG. 2 discloses one embodiment of an architecture 200 associated with the e-learning system. It should be appreciated that not all components illustrated in this architecture may be present in all embodiments, or present as illustrated. The e-learning system 156 is the platform that includes the e-learning module 210, which in one embodiment is the software which performs the associated functions. The e-learning module may, in turn, include other modules which perform various functions associated with delivering (e.g., streaming) training courses to an agent 271. The e-learning module 210 may interact over an interface 253 with a content delivery system ("CDS") 220 which has a corresponding e-learning interface module 227. In one embodiment, the CDS provides the streaming content, stored in a training content database 225, to the agent 271 using an interface 261. In other embodiments, the CDS 220 may also furnish the training courses in a downloadable format.

The e-learning module 210 may cooperate with a WFM 155 using an interface 257 for coordinating when an agent is to be trained. In some embodiments, the e-learning module 210 may rely on the WFM to schedule training courses. The WFM 155 may have an interface 258 to an agent work schedule database 260 that maintains the agent's work schedule information. The WFM 155 may also have an interface 250 with the call handler system ("CHS") 230 to coordinate when the agent is to be logged in for handling calls or paused for training. The WFM may also have an interface 249 to the agent workstation 160 for informing the agent about upcoming training.

The e-learning module may have an interface 251 for receiving agent performance metrics from other components, which can be used to identify which agents have poor performance, and hence may require additional training. The e-learning module may also have an interface 252 for allowing agents to be selected for training by an administrator. This could also be used by other components that interact with the e-learning system and/or users. The e-learning module may also have an interface 259 to an agent training profile database 212 which is updated as agents receive training. Once the agent's skills are updated, the e-learning module may also have an interface 255 to an agent skill level database 233 to update the agent's skills The agent skill level database may be used by the CHS 230 in routing calls to the agent. The e-learning module may also have an interface 254 to the CHS 230 for receiving information as to how busy an agent presently is. The e-learning module may provide training to agents who currently are not busy and an interface 256 may be used by the agent in conjunction with this capability.

The e-learning architecture 200 is able to deliver training courses to an agent in different ways, including streaming courses to their workstation 160. The e-learning architecture can provide training to agents in various forms, such as fixed-time, flex-time, and with further categorization related to the form of delivery are possible, such as on-demand or snippet training. Further description of these and other capabilities are found in the LMS Patent Application.

Figure 3:
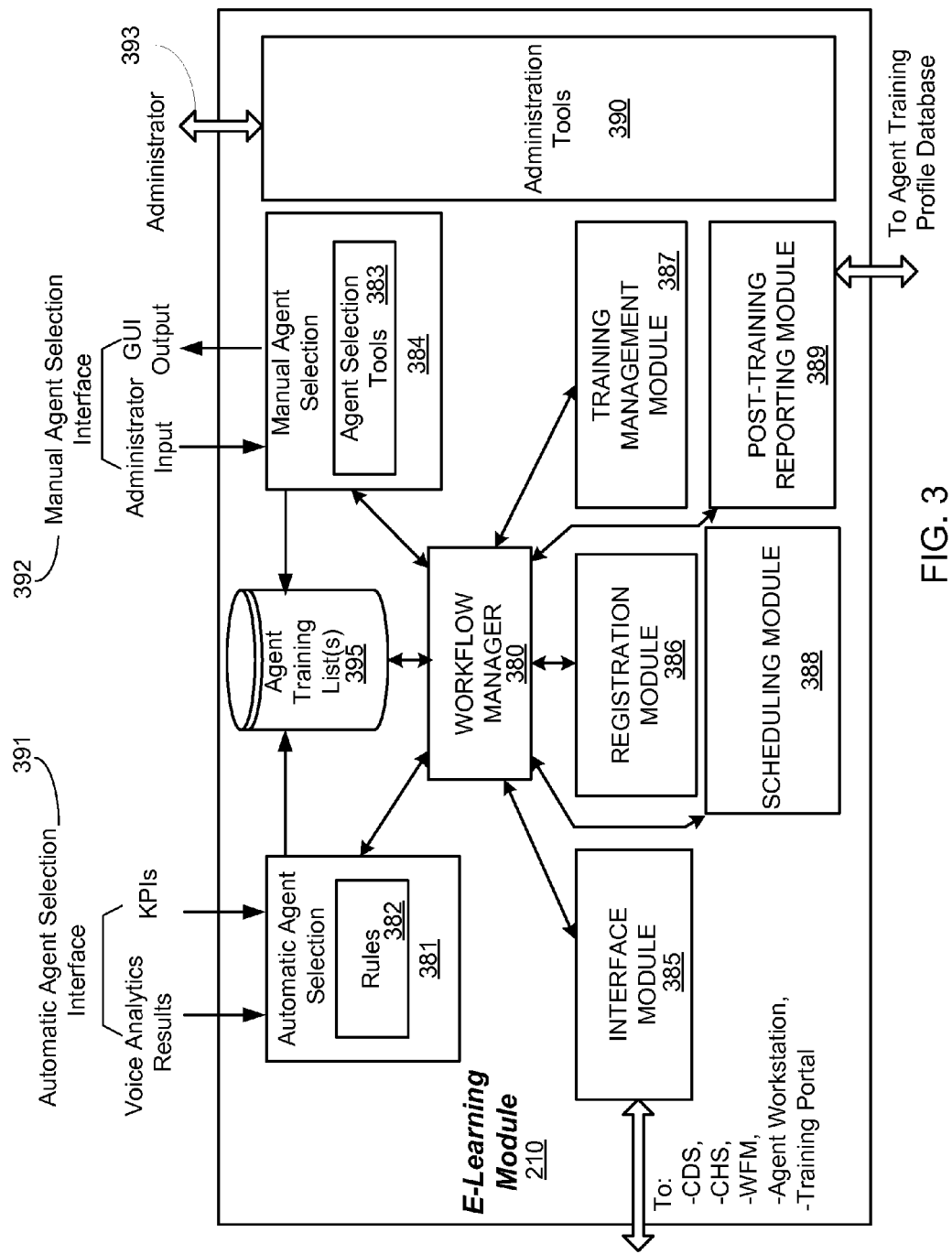
FIG. 3 illustrates one embodiment of the e-learning module.

Further details regarding the e-learning module 210 are shown in FIG. 3. The e-learning module in one embodiment may comprise a set of modules performing functions associated with the agent selection, registration, scheduling, and post-training reporting of training sessions. Not all modules are required in all embodiments.

In FIG. 3, the e-learning module 210 includes two agent selection modules, the automatic agent selection module 381 and the manual agent selection module 384. These modules can be used to select agents that are to be trained. The automatic agent selection module 381 may have one or more interfaces 391 to other call center components and the interface 391 receives metrics associated with agent performance. The rules component 382 indicates how these metrics may be used to identify the agents requiring additional training. Alternatively, or in addition, the manual agent selection module 384 may provide a GUI 392 using various agent selection tools 383 for allowing an administrator to manually select an agent. In some embodiments, the interface 392 may be an API to the training portal 158, or the manual agent selection module could comprise the training portal itself. The agent selection modules may store and/or access agent related data in the agent training list 395.

Once agents are selected, a workflow manager 380 may then invoke a registration module 386 to register the selected agents for the intended training course. Registration may involve ensuring that all prerequisites and other rules are met necessary for the agents to receive the training course materials. When completed, the workflow manager 380 may invoke the scheduling module 388, if the training is of a fixed-time format. The training content delivery may be triggered based on various conditions according to how the training format was defined. Once the training session has completed, the workflow manager is provided with the results by the CDS 220, and the workflow manager may invoke the post-training reporting module 389 to update the agent training profile database 212.

These capabilities may require the interface module 385 to interface and inform the workflow manager with other components, such as the CDS, the CHS, the WFM, agent workstation, and/or the training portal to receive and provide the appropriate updates. This communication by the interface module 385 can be provided using a LAN, WAN, or other communication facility.

Finally, the administration tools 390 can be used by an administrator via a GUI 393 to set various parameters of the e-learning system, and also to access the training management module 387 for storing and managing aspects of the training process. This can be used for setting parameters, limits, or managing other operational aspects. Additional details for this and other aspects are found in the aforementioned LMS Patent Application.

Training Portal Architectural Overview

The aforementioned e-learning system may provide limited user interfaces for interacting with the e-learning system. However, for some embodiments, the e-learning system may not provide the desired graphical user interfaces for allowing agents to manage their training, but another component may provide the graphical user interfaces. That is, in some embodiments, the e-learning system may be integrated with other call center components, such as the WFM, and this integrated system may be designed for administrator access to manage agent training, as opposed to allowing the agent to access the system. Instead, in these embodiments, a training portal 158 may be utilized to provide and manage the agent interaction. The training portal can act as a "front end," allowing various GUI forms to be defined and/or adapted for agent end-users, and provide a front-end interaction with the e-learning system. In particular instances, these embodiments allow customization of how the GUI is defined, and also "off-loads" this front-end processing from the e-learning system.

The training portal 158 can also provide various training management support functions that are useful and specific to an enterprise. For example, training management support functions may allow agents to define and review a training program comprising a series of courses required in order to achieve a new skill or certification level. Further, the training management support functions may allow agents to review courses previously taken in the training program, whether the courses were passed, what courses are available for a given agent to take, which of the available courses are required to complete a particular skill certification, when can the training courses be taken, etc. The training portal may also provide access to related content from other sources, but which content is not the actual training content administered by the e-learning system. For example, an agent may access various engineering, technical, and user manuals that are made available for the agent as support documents, but which are separate from the training courses provided by the CDS. For example, a training course may provide training on a product which the agent supports, and the training portal may also provide access to related support documents and product manuals for the product as background information to the agent.

Figure 4:
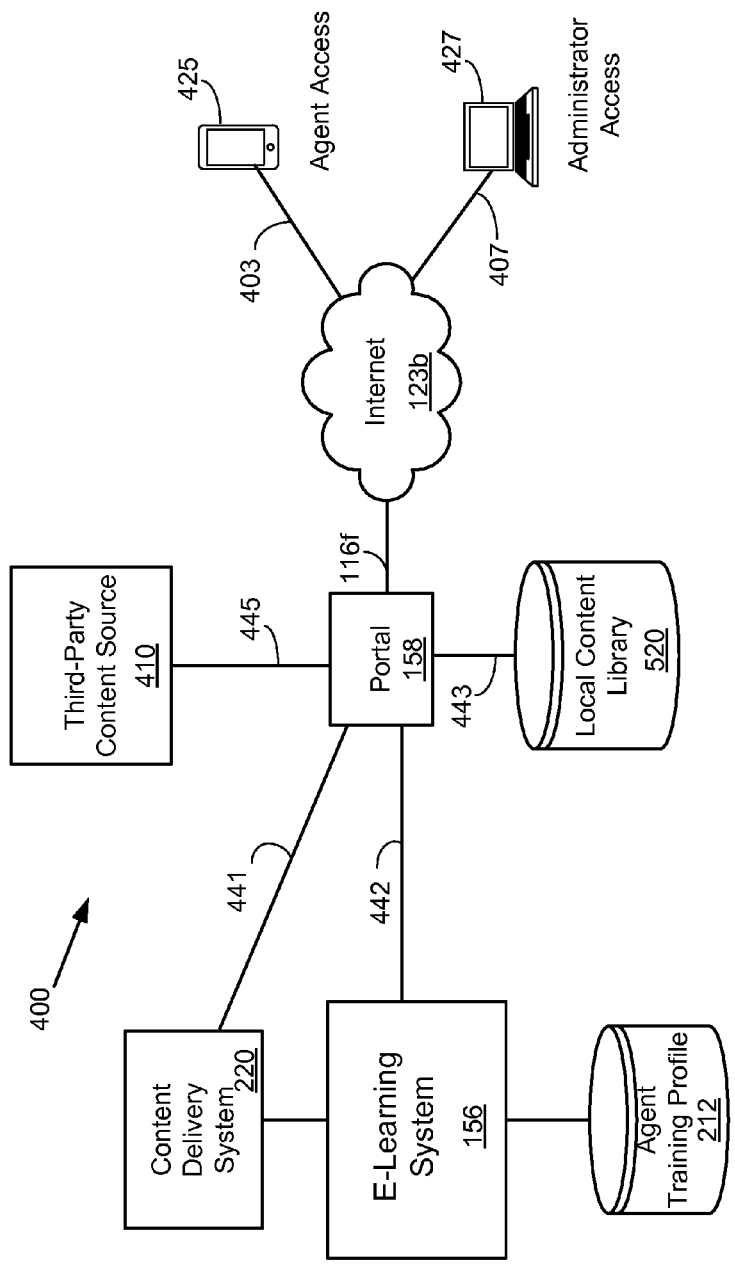
FIG. 4 illustrates one embodiment of an architecture comprising a training portal for facilitating downloadable training content from the e-learning management system.

One embodiment of the architecture 400 utilizing the training portal is shown in FIG. 4. The portal 158 may be embodied as a stand-alone web server, or in other embodiments, the portal may be integrated into platforms including other call center components. The portal 158 serves as the main user-interface for the agent and the administrator for managing agent training.

The portal 158 is typically interfaced via facilities 444 to the Internet 123*b*, which in turn can be accessed by a mobile device 425 operated by an agent using a variety of technologies 403. Thus, for purposes herein, reference to "interactions with the agent" or similar language means interactions with a processing device (such as a mobile device 425 or tablet computer) operated by the agent. The portal 158 could also be accessed by the agent using a PC or other stationary computing device 427 that accesses the Internet via various facilities 407 known in the art. For purposes of illustration, and not limitation, FIG. 4 depicts the agent using a mobile device 425 and the administrator using a stationary device 427 to access the portal. Once the agent or administrator accesses the portal 158, various web pages can be served and presented. Various illustrative web pages will be discussed shortly.

The portal 158 may access other call center components on the "back-end." These may vary in different embodiments. For example, the portal 158 may access the CDS 220 for receiving downloadable training content. This may occur over a facility 441, such as a LAN, WAN, or other form. The portal 158 may also access downloadable training content from a third party content source 410. In various embodiments, there may be a number of sources that provide various types of content. For example, one third-party content source may provide information on regulatory training content about certain types of financial instruments, while another third-party content provider may provide information about financial products from a particular vendor.

In some instances, the portal 158 may access a local content library 520 to provide downloadable information to an agent. For example, an agent being trained on a particular subject matter may seek supplemental information that is located in the local content library 520. For instance, an agent may receive training courses from the CDS system 220 regarding a computer product, but may also receive additional background information and access to the actual product user manuals to better understand the computer product. These user manuals could be stored in the local content library 520, and the agent may desire to download both the user manuals and the training course materials to study them. Similarly, other background subject matter may be available from a third-content source 410. For instance, other background subject matter could comprise a number of third party information sources available on various web sites. The training portal could access the local content library via any number of facilities 443, as well as access a third party content source via any number of facilities 445.

The portal 158 may also access the e-learning system 156 via facilities 442. The portal 158 may provide training content via the e-learning system 156 as opposed to via the CDS directly. In other words, in some embodiments, access to the CDS 220 is not provided directly to the portal 158, but only through the e-learning system 156. In other embodiments, the portal accesses the e-learning system to learn which CDS to access and how to access it.

For example, in particular embodiments, an agent may only be able to access training courses which the agent has been authorized to access by the e-learning system. Further, when an agent completes a training course and takes a test associated with the training course, the e-learning system may record and update the agent's training profile in the agent training profile database 212. Thus, in some embodiments, all portal interactions for receiving training courses and uploading training courses may be via the e-learning system, whereas in other embodiments, the portal may interact with the CDS directly.

To properly interact with the agent, the portal may first have to identify the agent, which can be accomplished by the agent logging into the portal using an identifier and password. Then, the portal may access the e-learning system to retrieve information about what courses the agent is allowed to take, defined training programs, what skills the agent is to be trained for, etc. The portal 158 may use this information to determine what training content the agent may download. In various embodiments, the training portal 158 may limit an agent's access to some training materials, but not others. For example, an agent desiring to become a supervisor may be required to be knowledgeable of the company's human resource ("HR") policies. Thus, the agent may access and download via the portal a copy of the company's HR Policy Manual, which may be stored in the local content library 520. Further, the portal may be configured to allow any agent to access the HR manual in addition to accessing training content. The agent may then need to access a training course and/or a test for becoming a supervisor. This may require the portal 158 to query the e-learning system to determine whether the agent is authorized to take the supervisor exam, which may cover aspects indicated in the HR manual. The portal may query the e-learning system to determine whether the content can be downloaded to the agent. If so, the e-learning system may obtain the training course from the CDS, or alternatively, may direct the portal to the CDS to download the content, and then provide the content to the agent.

In various embodiments, the e-learning system 156 is configured to process test results for a training course depending on whether the training course was downloaded to the agent using the training portal or streamed to the agent. Recall from the aforementioned patent application, the LMS Patent Application that streaming training content may be provided by the CDS 220 to the workstation used by the agent in various embodiments. In particular instances, the training content may incorporate a test in a testing portion that the user takes, and test results such as a score may be determined by the CDS 220 and provided to the e-learning module. Thus, the e-learning module is configured to accept the test results (e.g., the test score) from the CDS 220 and in response update the agent's training profile appropriately.

In contrast, with downloadable training content, the user interacts with the training content on their mobile device, and the mobile device then reports the test results to the training portal. Consequently, the training portal 158 must provide the test results to the e-learning system so that the e-learning system can appropriately update the agent's training profile. For instance, in various embodiments, the training portal 158 provides the test results to the content originator, which in one embodiment is the CDS 220. Thus, in this particular embodiment, the CDS is configured to receive the test results from the training portal and then report the test results to the e-learning module in a similar manner as it does for streaming content. This embodiment may not require any modifications to the e-learning module, since the e-learning module continues to receive the test results from the CDS. In another embodiment, the e-learning system could receive the test results directly from the training portal, and in response, update the agent's training profile. In either case, for these particular embodiments, either the CDS or the e-learning system is required to accept the test results from the training portal.

Agent Training Management

An agent may invoke various functions in managing their training. The scope of these functions may vary, but generally may include reviewing a course(s) taken, reviewing a course (s) to be taken, etc. One aspect of managing training may involve downloading training content to a mobile device so that the agent may review the content at a later time. For training courses that comprise a testing portion, or in the case of downloading just the testing portion, merely downloading the testing portion to the agent's mobile device does not inform the e-learning system whether the agent has successfully mastered the training materials. The test results (e.g., score) must be provided back (uploaded) to the e-learning system after the test has been taken for the e-learning system to carry out such functionality.

In various embodiments, the training portal allows the management of downloadable training content; this includes facilitating downloading the content itself, but also includes facilitating uploading the test results. With respect to downloading content, the portal facilitates various functions, including: determining what courses the agent can download, what order (if any) is imposed on downloading the training courses, and whether results for a previously downloaded prerequisite training course must be uploaded before any subsequent training course can be downloaded. The training portal can also enforce time limits such that a course downloaded to an agent must have the test results uploaded by a certain time.

Figure 5A:
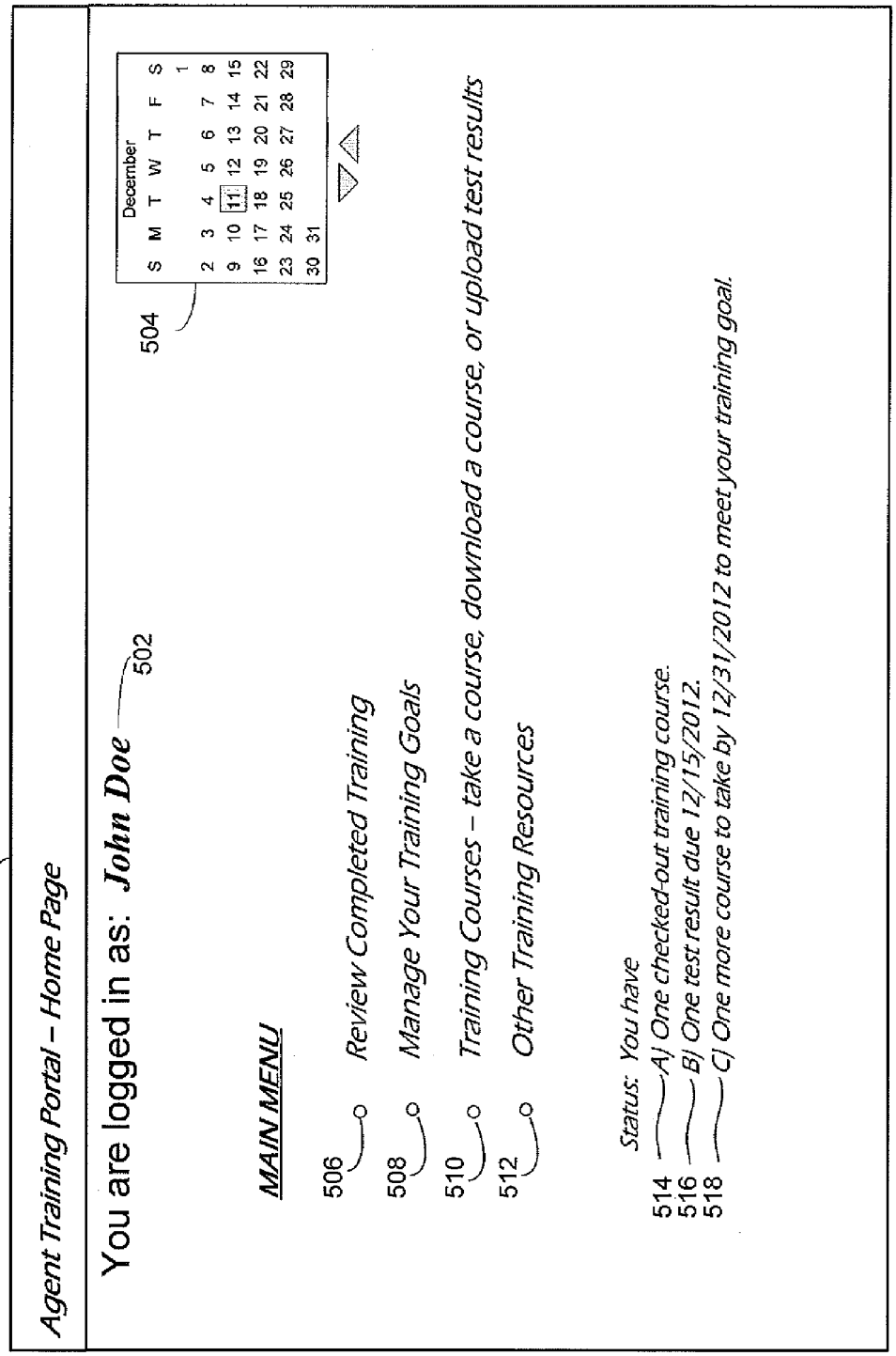
FIGS. 5A-5C illustrate various graphical user interfaces for facilitating downloadable training content.
Figure 5B:
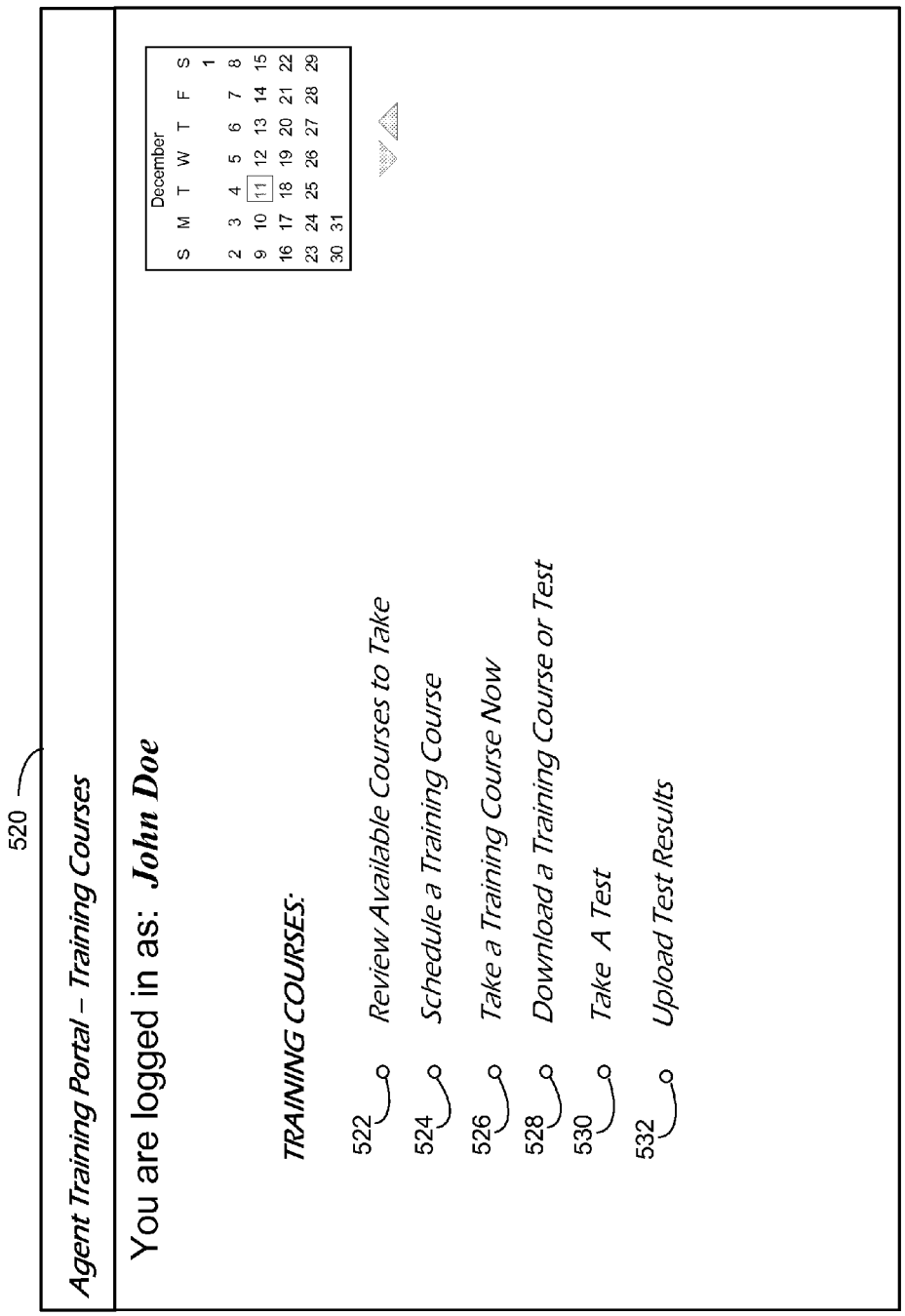
Figure 5C:
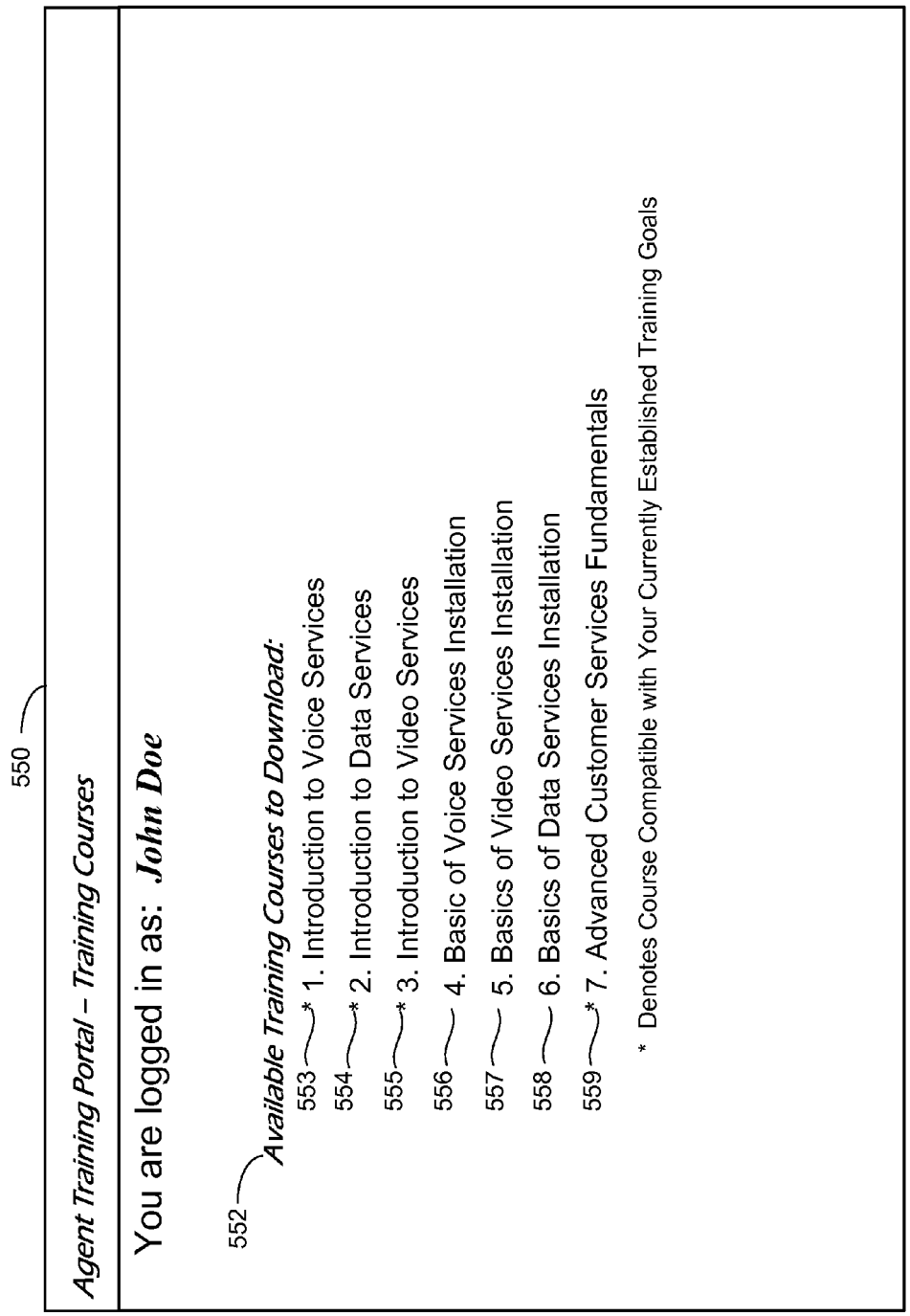

Various GUI screen formats can be used for facilitating agent interaction for training management. FIGS. 5A-5C illustrate various embodiments that could be used, although other variations are possible. Turning to FIG. 5A, a home screen (e.g., home page) 500 is illustrated that is presented to an agent after the agent has logged-in to the training portal and their identity is known. In one embodiment, the home page reflects the identity of the logged-in agent in a tag-line 502 and also depicts a current calendar 504.

The main menu comprises various functions 506-512 that the agent can invoke. This includes the "Review Completed Training" function 506, which may indicate to the agent recently completed training course names, test results (e.g., scores), and/or passing status. The agent may also elect the "Manage Your Training Goals" function 508, which may involve setting a target skill or education level, including defining when certain courses are expected to be completed based on the indicated calendar 504. The next function "Training Courses—take a course, download a course, or upload test results" 510 allows the agent to interact with the portal in regard to a specific training course, such as scheduling the course, taking the course, downloading the training course, or uploading test results for a training course. Finally, another option, the "Other Training Resources" function 512 may allow the agent to access other training resources, such as user manuals and other content located on other servers.

The home page 500 may also inform the agent of current status information. This may include, for example, indicating that the agent has downloaded or checked out a training course 514, that the agent has test results to be uploaded by a certain date 516, and that additional training courses are required to be taken in order to meet a training goal 518.

Focusing on the third function 510 ("Training Courses—take a course, download a course, or upload test results"), after selecting this function, the screen 520 shown in FIG. 5B may be presented to the agent. The first function, "Review Available Courses to Take" 522 on this screen allows the agent to review which courses can be taken. The allowable courses may be further segregated on the basis of which courses may be taken by interaction with the e-learning system and/or which training courses can be downloaded to a local device and interacted with subsequently.

The "Schedule a Training Course" function 524 allows the agent to schedule a training course at a subsequent time. In this embodiment, this function does not pertain to downloading a training course but, instead, pertains to scheduling a time to interact with the e-learning system for a particular training course that is streamed to the user.

The "Take a Training Course Now" function 526 allows the agent to request delivery of training content in an on-demand manner so as to interact with streaming content from the e-learning system. Again, this function does not pertain to downloading a training course in this embodiment.

The "Download a Training Course or Test" function 528 allows the agent to select and download a training course and/or a test. The agent can then interact with the training course at a subsequent time. The training course may be structured as having a training content portion and a testing portion, or the training course may be, in effect, only the testing portion. In this case, the training course may be identified as being a test (e.g., "Service Fundamentals Test"). From a procedural perspective, downloading a training course with an integral testing portion versus downloading a training course that comprises only a testing portion is very similar, if not the same.

The "Take a Test" function 530 allows the agent to request to presently take a test. This results in the agent interacting with the e-learning system, and is again distinct from downloading the test described above. This function generally pertains to interacting with streaming content that comprises the testing portion of a course.

The "Upload Test Results" function 532 allows the user to upload test results associated with a previously downloaded test or training course. This functionality generally pertains to uploading the test results from a previously downloaded course or testing portion.

Assuming that the agent selects the "Download a Training Course or Test" function 528, a separate screen 550 may be presented to the agent as shown in FIG. 5C. This screen 550 depicts the available courses that the agent may download 552. The various options 553-559 indicate the various training course names that can be downloaded. The list of courses may be limited based on the agent's pay-grade, shift, or other restrictions. Further, in this embodiment, certain courses 553, 554, 555, and 559 are marked with an asterisk ("*") indicating these courses are compatible in meeting a training goal established by the agent. In other words, completion of a specified goal requires the four indicated courses 553, 554, 555, 559 to be completed. Completing all the courses required for a goal may allow a new skill to be recorded in the agent training profile for that agent.

Once the agent selects a particular course to downloaded, the download occurs using well-established mechanisms known in the art for transferring applications from a host or server to a mobile device. The mobile device may have a "closed" operating system, in which case applications are downloaded from an "application store," or may be an "open" operating system, in which case a variety of sources can be used for downloading the applications. The remaining GUI screens can be devised by one skilled in the art in light of this disclosure for accomplishing the downloading, and the subsequent uploading of the test results.

Training Portal Process Flows

Figure 6:
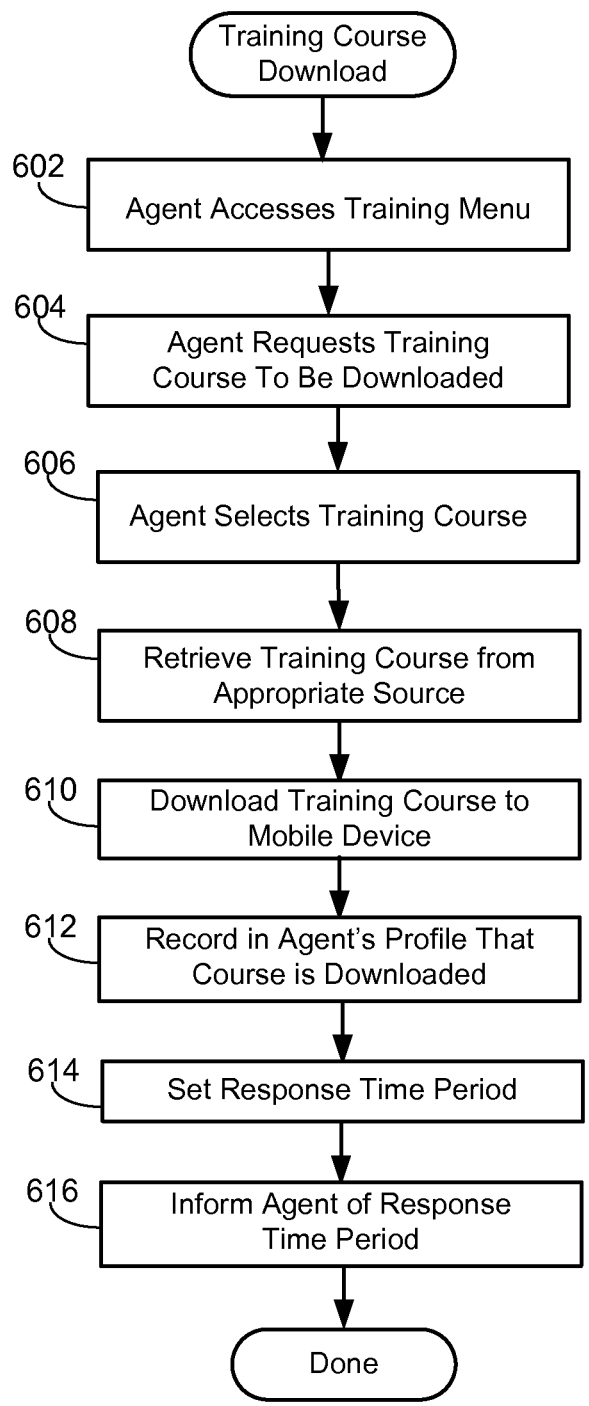
FIG. 6 illustrates one embodiment of a process flow for an agent downloading training content.
Figure 7:
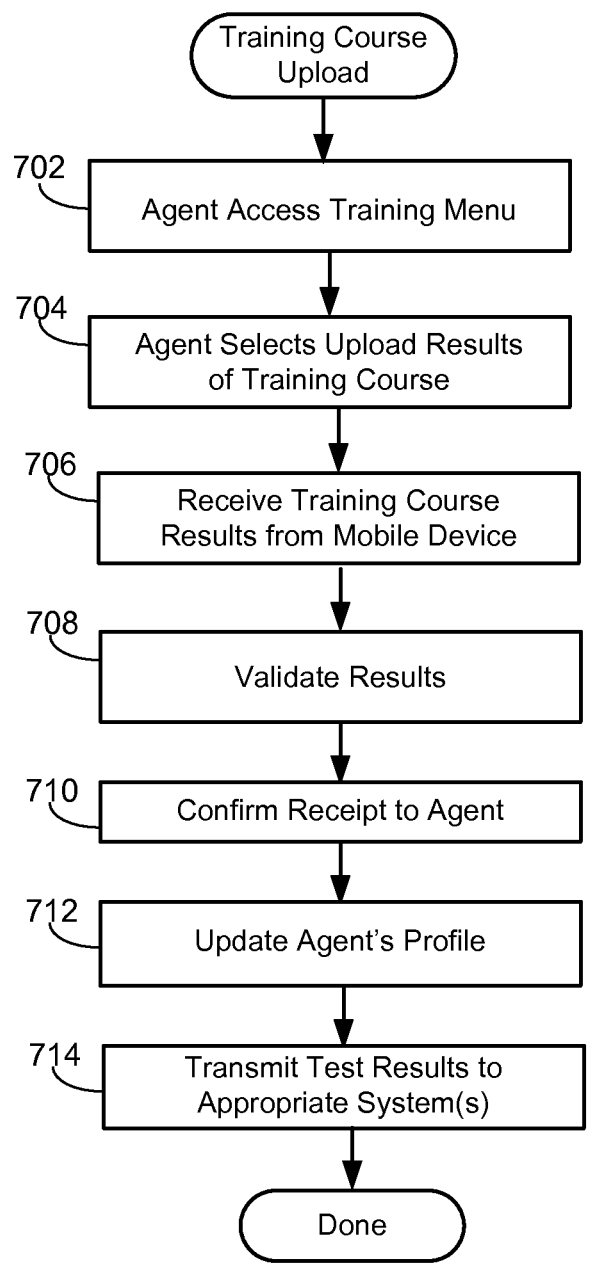
FIG. 7 illustrates one embodiment of a process flow for an agent uploading test results.

The process flows for the training portal to accommodate downloadable training courses, and the associated uploading of test results, are shown in FIGS. 6-7. Turning to FIG. 6, the process for downloading a training course to an agent begins in operation 602 with the agent logging into the portal and accessing the training menu. The agent may then request a training course to be downloaded in operation 604, and then selects a particular course in operation 606, assuming there are multiple options. The "training course" could be, in fact, a testing portion only, as largely the same procedures would apply.

In operation 608, the training portal retrieves the training course from the appropriate source, which may be, for example, a local library, a third party content provider, or the CDS. In some embodiments, training courses with a testing portion, wherein the testing portion is used for completion of a training goal, may only be available from the CDS (as opposed to, e.g., the local content library). In some embodiments, there may be several approved CDSs. The training content is then downloaded to the mobile device in operation 610. The portal may maintain temporary agent profiles, which indicate which training courses have been downloaded for which agents. If so, then the appropriate profile is updated in operation 612.

The training portal may further record that the training content was downloaded (as opposed to streamed) to the agent, and may note the download time as well. Training content may have a defined "life" during which it can be executed and the test can be taken. For example, the test may have to be taken within 48 hours of downloading. After that time, the application may prohibit execution of the test on the mobile device, and/or the training portal may not accept results for the test. The response period for uploading the results is set in operation 614, and the agent is informed of this time period on a web page in operation 616.

Presumably, at some time subsequent to when the training course was downloaded, the agent interacts with the training course on their mobile processing device (or stationary computer) and completes the exam. In some embodiments, the downloaded training materials comprise only a test portion, which the agent takes. The mobile device will retain the results, and at some point the agent logs back onto the portal using the mobile device and uploads the test results. This process is show for one embodiment in FIG. 7.

Turning to FIG. 7, the process begins with operation 702 with the agent accessing the training menu on the training portal. After navigating the appropriate menus, in operation 704 the agent indicates that they would like to upload the test results of the training course. The portal receives the results in operation 706. The results may include various authentication and identification tags such that the portal knows that the test results correspond with the course previously downloaded to the agent. The portal could add certain security data which is returned when the test results are uploaded, and a match validates the source and content. Since the training portal maintains a list of downloaded training courses for each agent, the training portal is able in operation 708 to validate the results. Namely, the training portal validates that the test results are from the correct agent, for the correct course, and have been timely received (e.g., the time limit has not expired). The receipt may be confirmed to the agent in operation 710, and the training portal updates the temporary agent profile in operation 712. The training portal also transmits the results to the appropriate components in operation 714 (e.g., such as the e-learning system and/or the CDS in various embodiments) so that the permanent agent training profile may be updated.

Figure 8:
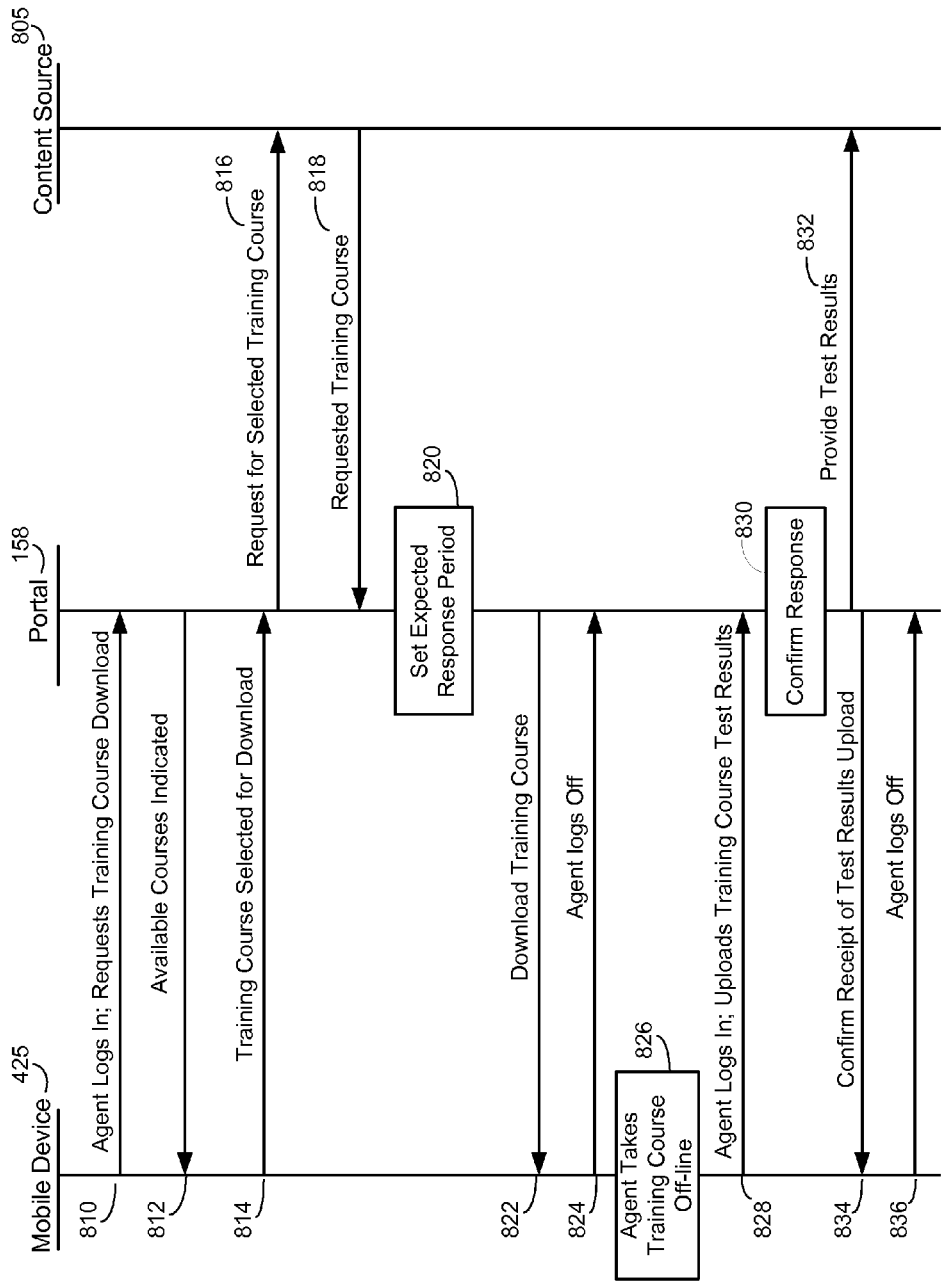
FIG. 8 illustrates one embodiment of a messaging flow associated with an agent downloading training content.

An illustration of an embodiment using a messaging diagram is shown in FIG. 8. This shows one embodiment of the message flows between the mobile device 425 operated by the agent, the portal 158, and the content source 805. The content source 805 could be, for example, the CDS 220, the local content library 520, or a third party content source 410, although in this embodiment it is presumed to be the CDS.

The process begins in message 810 with the agent logging into the portal using the mobile device. Further, it is assumed that the agent navigates the appropriate menus and screens, and requests downloading of a specific training course. This may be embodied as multiple messages, but this is shown as a single message for convenience. In message 812, the portal responds by presenting the mobile device a list of available training courses that can be downloaded. In message 814, the agent responds by selecting a particular course to be downloaded.

At this point, the portal 158 requests the same course to be downloaded from the appropriate content source in message 816. The portal may maintain a directory of which source is queried for downloading the content. The source may be a local content library 520, a third party content source 410, or the CDS 220. In other embodiments, the content may be integrated with the portal, so that no querying of the content source may be required. The content source 805 responds to the request by downloading the requested training course in message 818.

In this embodiment, the portal then determines whether a corresponding upload of test results is expected in the future. If the training course comprises only a content portion (and no testing portion), then no upload is expected. Presuming that the training course comprises a testing portion, then the portal expects the test results to be uploaded and determines an expected respond time in operation 820.

For practical purposes, if the content comprises a testing portion, and the testing portion is to be uploaded, then the content source is the CDS, since the CDS is configured to report test results to the e-learning module, whereas the local content library and the third party content source are typically not so configured. However, this may not be the case in some embodiments.

The portal then downloads the training course in message 822. The portal may also indicate to the agent the time period by which any test results must be uploaded. Once the mobile device receives the downloaded training course, then the agent may initiate a log-off message in message 824. The agent can then, at their convenience, interact with the training course using their mobile device in operation 826. Of course, in other embodiments, the agent may use a laptop or stationary computer. Depending on the circumstances, the agent's interaction with the training course may occur a number of hours or days after the download of the training content.

After the agent has completed the testing portion of the training content, the agent uses the mobile device to access the portal and logs in using messaging 828. The agent navigates the various pages on the training portal to upload the test results. The portal, in response to receiving the upload of the test results, confirms that a training course was downloaded for this agent and that an upload is expected from the agent in operation 830. Further, the portal confirms the uploaded results received are for the corresponding course and are uploaded within the time window required (if set).

Presuming no exception conditions are detected, the portal provides the test results in message 832 to the content source. In certain embodiments, if the CDS is the content source, then the portal may report the test results to the CDS. In turn, the content source (e.g., CDS) may then update the e-learning module with the test results as appropriate (not shown). While in other embodiments, the portal may provide the test results instead to the e-learning module directly. The portal then confirms the receipt of the upload to the mobile device in message 834 and the agent may then log-off in message 836.

Those skilled in the art will recognize in light of this disclosure that other message flows and/or sequencing may occur. For example, after confirming the upload in operation 830, the portal could first confirm receipt of the upload in message 834 to the agent and then provide the test results in message 832.

Figure 9:
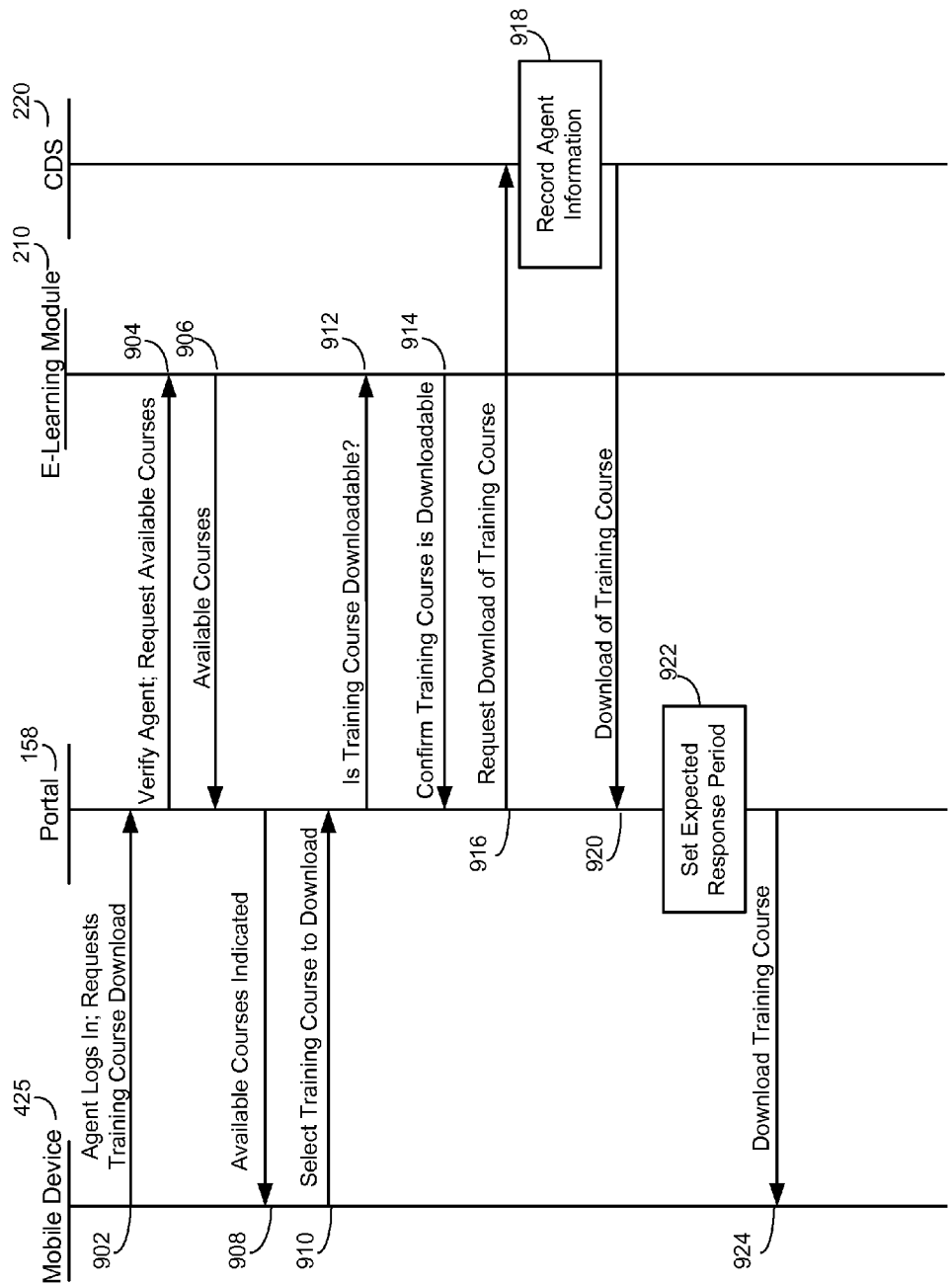
FIG. 9 illustrates another embodiment of a messaging flow associated with an agent downloading training content.

Another embodiment of alternative or additional message flows is shown in FIG. 9. This embodiment shows additional or alternate messaging that may occur between the portal 158, the e-learning module 210, and the CDS 220. In message 902, the agent logs into the portal using a mobile device 425 and requests to download a training course. In this instance, the portal may not maintain the information about what courses the agent is allowed to download, however the e-learning module 210 may maintain this information. Specifically, the portal may query the e-learning module to ascertain whether the agent is registered and able to receive the training course. Consequently, the portal queries the e-learning module in message 904 to verify the agent and obtains the information necessary to appropriately interact with the agent, including for example, a list of downloadable courses available for that agent. Other information may be returned to the portal, which may include prior courses taken by the agent, training goals, training schedules, etc. The e-learning module may access or may be provided with various data, including the training context data, to determine the available courses that can be downloaded. The e-learning module indicates this in message 906 back to the portal. The portal receiving the information may then provide this in various web pages to the mobile device in message 908. This could be presented, for example, using the web pages disclosed earlier.

The agent, after reviewing the training courses on the portal, may select a training course to download in message 910. The portal may confirm with the e-learning module in message 912 that the training course is currently downloadable. For example, there may be additional limitations, such as a maximum number of courses that can be downloaded at a given time, a requirement that the agent first upload the test results for a previously downloaded training course, etc. The e-learning module responds in message 914. In some embodiments, the e-learning module may inform the portal where to request the training course from (e.g., how to access the appropriate CDS), and provide appropriate authentication information for the portal to use when making the request to the CDS. The portal then in message 916 requests the training course from the CDS 220.

The CDS 220 may note that the training course has been downloaded and records the agent information in operation 918 so that the CDS knows to expect a response from the agent. The CDS downloads the training course in message 920 to the portal (which may also determine and/or indicate to the agent an expected response period). The portal in operation 922 then notes the expected response period and downloads the course to the mobile device in message 924. The remaining messages for uploading the test results may be similar as disclosed in FIG. 8. The portal and/or the CDS know to expect the test results from the mobile device at a subsequent time.

FIG. 9 is but one variation in which the portal may cooperation with the various components to affect the downloading of training content and uploading of test results for the agent. Other variations are possible in light of the disclosure provided herein.

Training Course Configuration

As noted earlier, the training course content may comprise a training content portion and a testing portion. Training course materials without a testing portion may not require the agent to upload any information. These materials may be supplemental or background in nature. If the content has a test (which the e-learning system tracks in an agent training profile), then the material is likely a training course from the CDS. In some embodiments, an upload may occur without returning any testing results. In these instances, the upload may merely indicate when and how long the agent interacted with the training course, but no measurement of knowledge retention or comprehension is indicated.

In other embodiments, the training course may be simply the testing portion, in which the training course can be referred to as a test. The test results reflect the knowledge imparted to the agent as a result of reviewing the one or more training courses previously downloaded. For example, in some embodiments, a series of training courses comprising training content portions and testing portions are taken, and after completion of all these courses, a certification test (e.g., exam) is then taken. In other embodiments, only a periodic re-certification exam may be required. Thus, it is possible that for a particular download, an agent may simply take a test (only), and upload the results.

Depending on the embodiment, the training courses can be structured in various forms, from videos to slide presentations, to multi-media text or lecture presentations. Further, the training courses can be structured to have limitations designed with respect to how many times a training course can be reviewed, limitations on whether the training course can be copied or transferred from the device, and/or time limits when the training course must be reviewed/completed. Various security and other mechanisms known to those in the art can prevent the agent from copying the training content or keeping the content indefinitely on their mobile device. For example, a downloadable training content may require that it be viewed within three days of being downloaded, after which it cannot be accessed and/or self-erases. Other security mechanisms can be employed to make it difficult to disseminate the content or otherwise make it available to unauthorized individuals.

Mobile Device Checkout

In some embodiments, the agent's personal mobile device may be used to download training course and interact with it. In other embodiments, the agent may not have a suitable mobile device or the agent may not have wireless or Wi-Fi service at their residence. Thus, the call center operator may offer a limited number of mobile devices to be "checked-out" when needed. These devices would typically be located at the call center, and the agent may check-out a device after completing a shift to be used during their off-hours. In particular embodiments, the checking out of a mobile device may be done manually as needed. While in other embodiments, each mobile device can be defined as a resource itself that is scheduled or allocated by the WFM for use by an agent. Accordingly, an agent could reserve a mobile device by scheduling its use using the WFM for a period of time. Thus, in these embodiments, the management of the availability of the mobile devices can be accomplished using the WFM. Once the agent picks up the mobile device, the agent could then access the portal at their convenience, download the training course, interact with the training course, and upload the test results within the required period of time.

Further, in particular embodiments, the mobile devices could be customized with security features to prohibit the training content from being viewed by unauthorized individuals. For instance, the mobile devices could be configured to prevent transfer of the training courses to another device, or could be configured to be used only by that agent by entering an appropriate security code. Thus, if the device is lost or stolen, the contents could not be easily viewed or obtained. In other embodiments, an identifier of the mobile device could be transmitted from the mobile device to the portal prior to download, and the portal could maintain a list of authorized mobile device identifiers that can receive downloadable content. This could add an additional layer of security to prevent unauthorized downloading of training courses to personal mobile devices, if so desired. In other embodiments, the mobile device could be configured to erase any downloaded training courses after a defined time period, rather than relying on the training course being so configured. In other embodiments, the downloading of the training content could be accomplished by the administrator, which then checks-out the mobile device to a particular agent with the content already downloaded.

Integration with the E-Learning Module

In particular embodiments, incorporating downloadable training modules into the e-learning system may involve various modifications to the e-learning system. As mentioned previously, one such modification involves uploading test results from the mobile device. After the agent interacts with the testing portion, the CDS would then provide the test results to the e-learning module and the e-learning module would update various records, including the agent's training profile.

With downloadable training courses, the agent interacts with the mobile device, not the CDS, in regard to taking the testing portion of the training course. The mobile device may initially analyze the test results (not the CDS), and in one embodiment, the test results may be communicated to the CDS by the mobile device. The CDS may, in turn, communicate the test results to the e-learning module. The procedures for communicating the test results from the CDS to the e-learning module may be largely the same, as the e-learning module is configured to receive a subsequent update of the test results from the CDS when the CDS streams the training course to the agent. Thus, the e-learning module may not be impacted by whether the CDS initially determines the test results or the CDS receives the test results from the agent's mobile device via a portal.

The CDS is configured, in one embodiment, to provide the training content in downloadable form to the portal (which in turn provides it to the mobile device), and expects a subsequent upload from the portal of the test results. Once a training course is downloaded, the CDS maintains a pending status of that download, indicating that a copy has been "checked-out." Once a set time expires, or the test results are uploaded, the CDS can then consider that copy of the training course as having been "checked-in." This allows the CDS to maintain, if desired, a maximum number of checked-out training courses for an e-learning system. Other restrictions may be defined, such as a maximum number of times a course may be downloaded by the CDS to a portal, which this mechanism can also support.

With respect to the e-learning module, required modifications can be described in view of the training process, which may involve the steps of: agent selection, registration, scheduling, content delivery, and post-training reporting (see, e.g., FIG. 2 and related text of the LMS Patent Application).

In terms of the "agent selection" training process step, which involves identifying those agents to receive training, the agents that are to receive downloadable training courses still need to be identified in this step. The call center administrator can use various tools for identifying which agents are allowed to receive downloadable training courses, including those disclosed in the LMS Patent Application and U.S. patent application Ser. No. 13/683,145 entitled Training Portal for Call Center Agent Training, filed on Nov. 21, 2012. For example, the various web pages disclosed in the latter application for administrator access could be used by the administrator to define which agents are eligible to receive which training courses. The administrator could associate an agent with a goal, and define which courses are associated with that goal, so that an agent could review their goal and the associated courses. In some embodiments, the data structures and related processing modules disclosed in U.S. patent application Ser. No. 13/683,145 entitled Training Portal for Call Center Agent Training, filed on Nov. 21, 2012, could be integrated into the e-learning module.

In terms of the "registration" training process step, registration may still apply to agents receiving downloadable training content. There may be any number of constraints defined, such as the maximum number of agents which can receive the training course, a limit on the number of "checked-out" training courses, or other restrictions. The registration of the agent may occur immediately after agent selection and/or may occur in response to the agent requesting downloadable training content.

In terms of the "scheduling" training process step, downloadable training courses are typically not scheduled, but are more akin to on-demand training courses, a form of flex-time training. That is, the agent determines when the downloading is to occur (as well as when the agent will interact with the training course executing on the mobile device). Thus, the scheduling training process step is typically by-passed with respect to downloadable training courses.

In terms of the "content delivery" training process step, this step occurs, but in a different form. Rather than the CDS streaming and directly interacting with the agent when the agent takes the training course, the CDS may download the content to the mobile device and the agent interacts with the training course off-line with respect to the CDS, using the mobile device. That is, the agent interacts locally with their mobile device, not with the CDS. Once the agent has completed their interaction with the mobile device, the results are then uploaded to the CDS. Thus, the downloadable training course capabilities herein provide an extension of the various forms of content delivery offered by the e-learning system.

In terms of the "post-training reporting" training process step, the e-learning module still receives the test results from the CDS, and performs similar updating of the agent's training profile. In this regard, the aspects of the e-learning module may be largely unchanged. The CDS, however, is modified to receive uploads from the portal.

Modifications may also be required to the various training context data ("TCD") maintained by the e-learning module. The TCD informs the e-learning module of the various types of training, and additional parameters may be defined to accommodate downloadable training content. For example, an additional parameter may indicate whether a training course is available in a training format to an agent in a flex-time training format comprising on-demand training form and/or a downloadable form. More specifically, a training course could be streamed to an agent on an on-demand basis at their workstation or home computer where the agent interacts with the CDS. That same training course could also be offered on a downloadable basis, where the agent interacts with a mobile device during off-hours (e.g., during breaks, during a day off, or when commuting). In another embodiment, a call center could allow a set of training courses to be offered either in downloadable or on-demand form. These courses could represent a series of training courses on a given product. However, when all the training courses are completed, a "certification exam" (e.g., having only a testing portion and no training content) that shows the agent has mastered the content may be taken. This certification exam (e.g., test) may not be downloadable, but may be limited to only being offered on an on-demand basis at the agent's workstation. This would ensure, e.g., that the agent did not receive any unauthorized assistance in taking the certification exam.

While some additional TCD parameters may be needed, many of the existing TCD parameters disclosed in the LMS Patent Application are applicable to downloadable training courses. For example, a "course completion date" indicates when the course is to be completed, and this may indicate the time period in which the agent must upload their test results.

On the other hand, some TCD parameters may not be applicable for downloadable course content. For example, the "bookmarkable" indicator is not really germane to the e-learning module. While the training course itself could be configured so that it is (or is not) bookmarkable when executed in the mobile device, this aspect is not controlled by the e-learning module and/or the CDS as it is in a streaming context. Those skilled in the art may find a utility to add other parameters to accommodate downloadable training content, or slightly redefine the existing TCD parameters.

Exemplary Computer Processing Device

Figure 10:
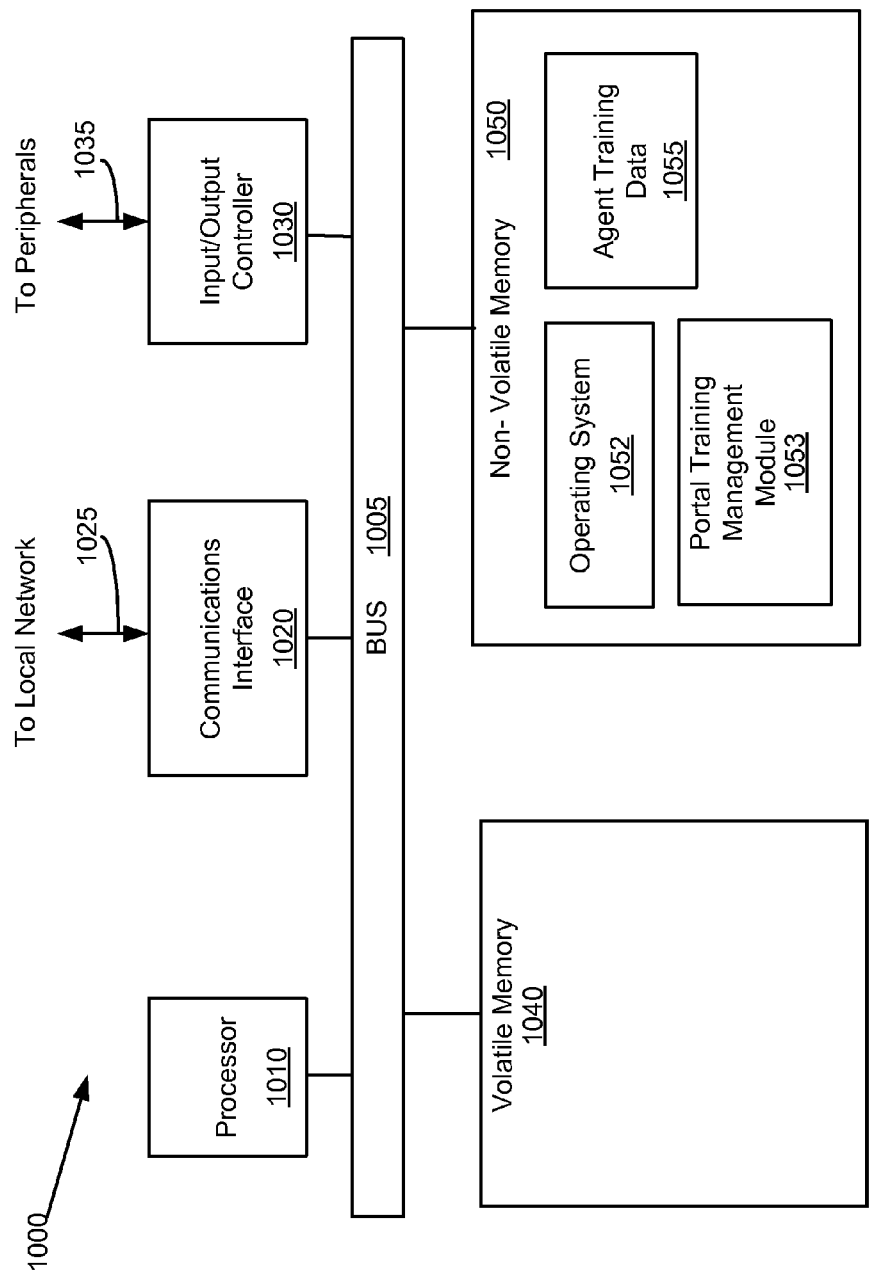
FIG. 10 illustrates one embodiment of a processing device used to practice the technologies disclosed herein.

FIG. 10 is an exemplary schematic diagram of a computer processing system that may be used in an embodiment of the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1010 that may communicate with other elements within the processing system 1000 via a bus 1005. The processor 1010 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1020 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1030 may also communicate with one or more input devices or peripherals using an interface 1035, such as, but not limited to: a keyboard, a mouse, a touch screen/display input, microphone, pointing device, etc. The input/output controller 1030 may also communicate with output devices or peripherals, such as displays, printers, speakers, headsets, banner displays, etc. These may be used, in part, to receive Administrator input, including for interacting with the manual agent selection module.

The processor 1010 may be configured to execute instructions stored in volatile memory 1040, non-volatile memory 1050, or other forms of computer readable storage media accessible to the processor 1010. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1050 may store program code and data, which also may be loaded into the volatile memory 1040 at execution time. Specifically, the non-volatile memory 1050 may store the portal training management module 1053 that may perform the above mentioned process flows and/or operating system code 1052 containing instructions for performing the process and/or functions associated with the technologies disclosed herein. The portal training management module 1053 may also access, generate, or store the various agent training related data 1055, including the data described above in conjunction with training profiles, goals, etc., in the non-volatile memory 1050, as well as in the volatile memory 1040. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 1010. These may form a part of, or may interact with, the portal training management module 1053.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for updating a user training profile of a user comprising:
    a portal configured to provide one or more web pages to a mobile processing device used by the user, the one or more web pages informing the user of a training goal and a plurality of training courses to be passed to achieve the training goal, and facilitating the user requesting to download a training course from the plurality of training courses to the mobile processing device wherein the training course comprises a training content portion and a testing portion, the portal further configured to:
    receive an identifier that has been transmitted by the mobile processing device used by the user, the identifier having been installed on the mobile processing device to uniquely identify the mobile processing device as authorized to receive downloadable content from the portal and verify the mobile processing device is authorized to receive downloadable content based on the identifier,
    request the training course, add security data to the training course prior to downloading the training course, download the training course to the mobile processing device, and upon upload of a test result associated with the testing portion and the security data, validate the test result based on the security data to ensure the test result is from the user and is for the training course and upon validating the test result, forward the test result to the content source, wherein the one or more web pages are further configured to facilitate the user uploading the test result;
    an e-learning module configured to store the user training profile and further store training context data indicating an association of the training course and the user, wherein the association indicates the user is authorized to access the training course, and the training context data further indicates the training course is downloadable to the mobile processing device used by the user; and
    a content source configured to store the training course and provide the training course to the portal upon request from the portal, the content source further configured to receive the test result from the portal at a subsequent time after the training course is downloaded to the mobile processing device used by the user and to indicate the test result to the e-learning module, wherein the e-learning module updates the user training profile based on the test result.

2. The system of claim 1, wherein the training context data further indicates the training course is capable of being streamed to the user.

3. The system of claim 1, wherein the portal is further configured to query the e-learning module for authorization to download the training course to the mobile processing device.

4. The system of claim 1, wherein the e-learning module is configured to update the user training profile indicating a name of the training course and the test result associated with the testing portion of the training course.

5. The system of claim 4, where the e-learning module is further configured to update the user training profile in response to receiving the test result from the content source.

6. The system of claim 1, wherein the portal is configured to inform the user of a date or time when the test result is required to be uploaded to the portal.

7. A method for downloading training content comprising the steps of:
    storing in an e-learning module of a processing system a training goal for a user, the training goal indicating a plurality of training courses to be passed in order for the user to achieve the training goal;
    receiving a user log-in at a training portal, the user log-in identifying the user;
    sending a request from the training portal to the e-learning module for the training goal of the user;
    receiving the training goal from the e-learning module at the training portal;
    informing the user of the training goal and the plurality of training courses to be passed to achieve the training goal by transmitting a web page to a processing device used by the user;
    receiving an indication from the processing device to download a training course from the plurality of training courses associated with the training goal, the training course comprising a testing portion;
    receiving an identifier transmitted by the processing device used by the user at the training portal, the identifier having been installed on the processing device to uniquely identify the processing device;
    in response to receiving the identifier at the training portal, verifying the processing device is authorized to receive downloadable content based on the identifier;
    requesting from a content source by the training portal the training course stored in the content source;

adding security data to the training course prior to transmitting the training course;

transmitting by the training portal to the processing device used by the user the training course;

facilitating the user uploading a test result associated with the testing portion and the security data by the training portal; and upon upload of the test result and the security data, validating the test result based on the security data to ensure the test result is from the user and is for the training course.

8. The method of claim 7 further comprising the step of:

indicating an upload date to the user wherein the test result associated with the training course is required to be uploaded to the portal on or before the upload date.

9. The method of claim 7, wherein the content source updates the training goal in the e-learning module using the test result.

10. The method of claim 7, further comprising the steps of:

rejecting a request to download a second training course from the user because the test result of the training course has not been uploaded to the training portal by the user.

11. A non-transitory computer readable storage medium storing instructions which when executed by a processor in a training portal causes the processor to:

validate a user log-in, the user log-in identifying a user;

send a request to an e-learning module for a training goal of the user, the training goal indicating a plurality of training courses to be passed by the user in order to achieve the training goal;

receive the training goal from the e-learning module;

inform the user of the training goal and the plurality of training courses to be passed to achieve the training goal;

receive a selection from the user to download of a training course from the plurality of training courses, the training course comprising a testing portion;

receive an identifier transmitted by a processing device used by the user, the identifier having been installed on the processing device to uniquely identify the processing device;

in response to receiving the identifier, verify the processing device is authorized to receive downloadable content based on the identifier;

transmit a request to a content source for the training course;

add security data to the training course prior to transmitting the training course;

transmit the training course to the processing device used by the user;

facilitate the user uploading a test result associated with the testing portion and the security data; and upon upload of the test result and the security data, validate the test result based on the security data to ensure the test result is from the user and is for the training course.

12. The non-transitory computer readable storage medium of claim 11, further comprising instructions that when executed by the processor cause the processor to:

indicate a date or time to the user when the test result is required to be uploaded to the training portal.

13. The non-transitory computer readable storage medium of claim 12, further comprising instructions that when executed by the processor cause the processor to:

validate that the test result is received no later than the date or time when the test result is required to be uploaded to the training portal.

14. The non-transitory computer readable storage medium of claim 11, further comprising instructions that when executed by the processor cause the processor to:

reject a request by the user to download another training course because the test result has not been uploaded by the user.

15. The non-transitory computer readable storage medium of claim 11, further comprising instructions that when executed by the processor cause the processor to:

receive a request from the user for a supplemental training document;

retrieve the supplemental training document from a local content library without querying the e-learning module, wherein the supplemental training document is related to the training goal and provides supplemental information in addition to information provided by the plurality of training courses; and download the supplemental training document to the processing device.

\* \* \* \* \*